Patented Dec. 11, 1928.

1,694,391

UNITED STATES PATENT OFFICE.

WHARTON B. McLAUGHLIN, OF NEW YORK, N. Y.; CELIA BROWN McLAUGHLIN ADMINISTRATRIX OF SAID WHARTON B. McLAUGHLIN, DECEASED.

PREPARATION OF EDIBLE FATS.

No Drawing. Application filed April 17, 1922. Serial No. 554,182.

This invention relates to the preparation of fatty substances, which are solids at ordinary temperatures, for more convenient and economical use and it is especially applicable to chocolate, sweet and unsweetened. In the case of chocolate, considerable difficulty is experienced in getting the substances in a condition to be used in the manufacture of syrups, and ice cream. These difficulties are so great that only in very exceptional cases is chocolate used for their manufacture, the vast bulk of these commodities being made from cocoa butter which contains twenty-five to twenty-six per cent butter fat. For example, ice cream as made to-day is almost entirely a cold process and the finely powdered cocoa is mixed with the cream and frozen. In the case where syrups are made, as a rule, they are compelled to dilute the chocolate with glycerine in order to lower its melting point and secure miscibility with the sugar solution. I have discovered that if melted chocolate be sprayed into a current of moving gas such as air, the temperature of which is below the solidifying point of chocolate, that this sprayed chocolate congeals while suspended in the current of gas and the resultant product can be collected in the form of a fine powder. And, further, that this powder is quickly and easily available for the various industrial purposes for which cocoa is now used, and a richer, more palatable product obtained. For example, this powder can be stirred into warm syrup and a chocolate syrup is easily and readily produced. It can be stirred into an ice cream mixture and a chocolate ice cream base quickly and readily prepared.

By my process a finely powdered chocolate with a cocoa butter content of over 30% can be made. By processes as heretofore practiced it has been impossible to produce chocolate in powdered form with a cocoa butter content of this magnitude.

It is evident that this invention is applicable to any mixture of chocolate with other substances, I, however, do not limit myself in its use to chocolate but it may be applied to other fats which are solids at ordinary air temperatures.

Having now described my invention, that which I claim as new and on which I desire to secure Letters Patent is:

1. The method of producing chocolate in powder form which consists in spraying melted chocolate into a current of cold air.

2. The method of preparing a chocolate powder which consists in spraying the melted chocolate into a current of gas at a temperature lower than the solidifying point of the chocolate.

WHARTON B. McLAUGHLIN.

CERTIFICATE OF CORRECTION.

Patent No. 1,694,391.  Granted December 11, 1928, to

WHARTON B. McLAUGHLIN.

It is hereby certified that error appears in the printed specification of the above numbered patent requiring correction as follows: After line 52, insert the following as claim 1:

"1. A chocolate in the form of a fine powder containing more than thirty per cent cocoa butter."

Lines 53 and 56, for claim or claims "1 and 2" read "2 and 3"; and that the said Letters Patent should be read with these corrections therein that the same may conform to the record of the case in the Patent Office.

Signed and sealed this 17th day of December, A. D. 1929.

(Seal)

M. J. Moore,
Acting Commissioner of Patents.